(12) United States Patent
Hasegawa et al.

(10) Patent No.: US 9,259,900 B2
(45) Date of Patent: Feb. 16, 2016

(54) POROUS FILM, BATTERY SEPARATOR, AND BATTERY

(75) Inventors: Hirohiko Hasegawa, Niihama (JP); Yasuo Shinohara, Tsuchiura (JP); Daizaburo Yashiki, Niihama (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 367 days.

(21) Appl. No.: 13/388,874

(22) PCT Filed: Aug. 2, 2010

(86) PCT No.: PCT/JP2010/063437
§ 371 (c)(1),
(2), (4) Date: Feb. 3, 2012

(87) PCT Pub. No.: WO2011/016571
PCT Pub. Date: Feb. 10, 2011

(65) Prior Publication Data
US 2012/0129034 A1    May 24, 2012

(30) Foreign Application Priority Data

Aug. 6, 2009 (JP) .................. 2009-183164
Aug. 6, 2009 (JP) .................. 2009-183165

(51) Int. Cl.
| | |
|---|---|
| *H01M 2/16* | (2006.01) |
| *H01M 2/18* | (2006.01) |
| *B32B 27/18* | (2006.01) |
| *B32B 27/32* | (2006.01) |
| *C08J 5/18* | (2006.01) |
| *C08L 23/06* | (2006.01) |
| *C08L 23/02* | (2006.01) |
| *H01M 10/052* | (2010.01) |

(52) U.S. Cl.
CPC ............. *B32B 27/18* (2013.01); *B32B 27/32* (2013.01); *C08J 5/18* (2013.01); *C08L 23/06* (2013.01); *H01M 2/1653* (2013.01); *H01M 2/1686* (2013.01); *B32B 2535/00* (2013.01); *C08J 2201/046* (2013.01); *C08J 2323/06* (2013.01); *C08L 23/02* (2013.01); *H01M 10/052* (2013.01)

(58) Field of Classification Search
None
See application file for complete search history.

(56) References Cited

U.S. PATENT DOCUMENTS

| | | | |
|---|---|---|---|
| 5,948,519 A | 9/1999 | Yagi et al. | |
| 6,447,958 B1 | 9/2002 | Shinohara et al. | |
| 2002/0034689 A1 | 3/2002 | Hoshida et al. | |
| 2006/0055075 A1* | 3/2006 | Hoshida et al. | ............ 264/154 |
| 2009/0011337 A1 | 1/2009 | Kajita et al. | |

FOREIGN PATENT DOCUMENTS

| | | |
|---|---|---|
| CN | 1331496 A | 1/2002 |
| CN | 101339980 A | 1/2009 |
| JP | 7-309965 A | 11/1995 |
| JP | 09094893 A | 4/1997 |
| JP | 10298325 A | 11/1998 |
| JP | 11106533 A | 4/1999 |
| JP | 2000-030686 A | 1/2000 |
| JP | 2001-023602 A | 1/2001 |
| JP | 2001-146530 A | 5/2001 |
| JP | 2001-316006 A | 11/2001 |
| JP | 2002-069221 A | 3/2002 |
| JP | 2002-128943 A | 5/2002 |
| JP | 2006-307163 A | 11/2006 |

OTHER PUBLICATIONS

Saunders et al. "Analysis of polyolefins by GPC/SEC" Jan. 2011.*

* cited by examiner

*Primary Examiner* — Ladan Mohaddes
(74) *Attorney, Agent, or Firm* — Sughrue Mion, PLLC

(57) ABSTRACT

A porous film which is produced using a resin composition containing an ultra-high-molecular-weight polyolefin and a polyolefin wax having a weight average molecular weight of 3000 or less, in which the number of branches per 1000 carbon atoms that constitute the main chain of the polyolefin wax is 15 or less; a porous film which is produced using a resin composition containing an ultra-high-molecular-weight polyolefin and a polyolefin wax having a weight average molecular weight of 3000 or less, and which does not substantially contain a component that melts at a temperature of 60° C. or lower; a laminated porous film which comprises one of the porous films and a heat-resistance porous layer laminated on at least one surface of the porous film; and a separator for batteries, which comprises the porous film or the laminated porous film.

10 Claims, No Drawings

POROUS FILM, BATTERY SEPARATOR, AND BATTERY

CROSS REFERENCE TO RELATED APPLICATIONS

This application is a National Stage of International Application No. PCT/JP2010/063437 filed Aug. 2, 2010, claiming priority based on Japanese Patent Application No. 2009-183164, filed Aug. 6, 2009, and Japanese Patent Application No. 2009-183165, filed Aug. 6, 2009, the contents of all of which are incorporated herein by reference in their entirety.

TECHNICAL FIELD

The present invention relates to a porous film, a battery separator, and a battery.

BACKGROUND ART

A porous film is used for various applications, such as hygiene material, medical material and battery separator. In the case of using a porous film as a battery separator of a lithium ion secondary battery or the like, high puncture strength is required.

As a porous film superior in the puncture strength, it is known to use a porous film obtained by kneading a high-molecular-weight polyolefin having a weight average molecular weight of $5\times10^5$ or more, a thermoplastic resin having a weight average molecular weight of $2\times10^4$ or less, and a fine particle; shape-forming the kneaded product into a sheet; and then stretching the sheet (see, JP2002-69221A (Patent Document 1)). Such a porous film can be easily obtained from the polyolefin having a high molecular weight, without using an organic solvent in the production process, and the obtained porous film is superior in the puncture strength.

Also, it is known to obtain a laminated porous film as a battery separator by laminating a porous heat-resistant layer on a porous film made of a thermoplastic polymer (see, JP2000-30686A (Patent Document 2)). A battery using this laminated porous film as the separator is superior in safety, since even when the porous film melts upon extraordinary heat generation due to overcharge or the like, the heat-resistant layer can prevent contact between the positive electrode and the negative electrode.

Such a laminated porous film can be obtained by a method of applying a solution containing a heat-resistant resin on a porous film and then volatilizing the solvent from the solution to form a heat-resistant layer, or by a method of applying the above-described solution on a porous film and then exposing the resultant to a poor solvent to precipitate the heat-resistant resin. These methods are simple and superior in productivity. However, the laminated porous film obtained by such a method is required to have more improved adhesive strength between the heat-resistant layer and the porous film.

SUMMARY OF THE INVENTION

An object of the present invention is to provide a porous film which ensures that, when a heat-resistant layer is laminated thereon, the heat-resistant layer does not tend to peel off; a laminated porous film made of the porous film and a porous heat-resistant layer laminated together; a battery separator; and a battery.

The present invention includes [1] to [6].

[1] A porous film obtained using a resin composition containing an ultrahigh-molecular-weight polyolefin and a polyolefin wax having a weight average molecular weight of 3,000 or less, wherein the number of branches per 1,000 carbon atoms constituting the main chain of the polyolefin wax is 15 or less.

[2] A porous film obtained using a resin composition containing an ultrahigh-molecular-weight polyolefin and a polyolefin wax having a weight average molecular weight of 3,000 or less, wherein the film is substantially free from a component which melts at 60° C. or lower.

[3] The porous film as described in [1] or [2] above, wherein the resin composition contains the polyolefin wax in an amount of 5 to 50 wt %, provided that the weight of the resin composition is 100%.

[4] A laminated porous film, wherein a porous heat-resistant layer is laminated on at least one surface of the porous film described in any one of [1] to [3] above.

[5] The porous film as described in any one of [1] to [3] above, or the laminated porous film as described in [4] above, which is a battery separator.

[6] A battery comprising the battery separator described in [5] above.

According to the present invention, it is possible to provide a porous film which ensures that, when a heat-resistant layer is laminated thereon, the heat-resistant layer does not tend to peel off; a laminated porous film made of the porous film and a porous heat-resistant layer laminated together; a battery separator; and a battery.

MODE FOR CARRYING OUT THE INVENTION

A first porous film of the present invention is a porous film obtained using a resin composition containing an ultrahigh-molecular-weight polyolefin and a polyolefin wax having a weight average molecular weight of 3,000 or less, wherein the number of branches per 1,000 carbon atoms constituting the main chain of the polyolefin wax is 15 or less.

A second porous film of the present invention is a porous film obtained using a resin composition containing an ultrahigh-molecular-weight polyolefin and a polyolefin wax having a weight average molecular weight of 3,000 or less, wherein the film is substantially free from a component which melts at 60° C. or lower.

The ultrahigh-molecular-weight polyolefin for use in the present invention is a polyolefin having a weight average molecular weight of $5\times10^5$ or more, and, in view of strength of the porous film, preferably a polyolefin having a weight average molecular weight of $10\times10^5$ or more. From the standpoint of formability, the weight average molecular weight of the ultrahigh-molecular-weight polyolefin is usually $50\times10^5$ or less, and preferably $40\times10^5$ or less. The ultrahigh-molecular-weight polyolefin includes a high-molecular-weight homopolymer or copolymer obtained by polymerizing, for example, ethylene, propylene, 1-butene, 4-methyl-1-pentene or 1-hexene. Above all, an ultrahigh-molecular-weight polyethylene mainly composed of a monomer unit derived from ethylene is preferred.

The polyolefin wax for use in the present invention is a polyolefin wax having a weight average molecular weight of 3,000 or less. The weight average molecular weight of the polyolefin wax is preferably from 500 to 2,500. Examples of the polyolefin wax include a polyethylene-based polymer, such as ethylene homopolymer and ethylene-α-olefin copolymer; a polypropylene-based polymer, such as propylene homopolymer and propylene-α-olefin copolymer; 4-methylpentene-1 polymer; a poly(butene-1); and an ethylene-vinyl acetate copolymer. A polyolefin wax superior in the compatibility with the ultrahigh-molecular-weight polyolefin is preferably selected. For example, when the ultrahigh-molecular-weight polyolefin is an ultrahigh-molecular-weight polyethylene, it is preferable to use a polyethylene wax such as ethylene homopolymer and ethylene-α-olefin copolymer.

Generally, the weight average molecular weight of the ultrahigh-molecular-weight polyolefin or polyolefin wax can be determined by GPC measurement.

In the first porous film of the present invention, the number of branches per 1,000 carbon atoms constituting the main chain of the polyolefin wax is 15 or less, preferably 10 or less, and more preferably 5 or less. While the reason is not clearly known, it is considered that, in the case where the above-described number of branches is small, the resin composition does not tend to swell or melt even by the heat applied during processing or by the contact with an organic solvent which is used when a heat-resistant layer is laminated on the porous film in the later-described method, whereby the porous film has a dense surface, ensuring a large contact area with a heat-resistant layer, as a result, the adhesiveness between the porous film and the heat-resistant layer increases.

The number of branches per 1,000 carbon atoms constituting the main chain of the polyolefin wax can be calculated by $^1$H-NMR measurement.

In the present invention, the porous film is produced using the above-described resin composition containing an ultrahigh-molecular-weight polyolefin and a polyolefin wax. Provided that the weight of the resin composition is 100 wt %, the proportion of the polyolefin wax is preferably from 5 to 50 wt %, and more preferably from 10 to 40 wt %. Also, the amount of the ultrahigh-molecular-weight polyolefin contained in the resin composition is preferably from 50 to 95 wt %, and more preferably from 60 to 90 wt %. The resin composition having such a formulation exhibits superior workability, and, at the same time, accelerate crystallization of the ultrahigh-molecular-weight polyolefin, so that a porous film superior in the strength can be obtained.

The second porous film of the present invention is substantially free from a component which melts at 60° C. or lower. While the reason is not clearly known, it is considered that, in the case where a component which melts at 60° C. or lower is substantially absent, the resin composition does not tend to swell or melt even by the heat applied during processing or by the contact with an organic solvent which is used when a heat-resistant layer is laminated on the porous film in the later-described method, whereby the porous film has a dense surface, ensuring a large contact area with a heat-resistant layer, as a result, the adhesiveness between the porous film and the heat-resistant layer increases.

Whether or not a component which melts at 60° C. is contained in the porous film can be confirmed by differential scanning calorimetry (DSC).

The second porous film of the present invention is obtained using a material which is substantially free from a component which melts at 60° C. That is, the second porous film of the present invention can be obtained using a material which is substantially free from a component which melts at 60° C., as the ultrahigh-molecular-weight polyolefin or polyolefin wax contained in the resin composition used for the production of the porous film, or as other materials contained in the porous film produced.

The resin composition used for the production of the porous film of the present invention may contain a component other than the ultrahigh-molecular-weight polyolefin and the polyolefin wax having a weight average molecular weight of 3,000 or less. For example, the porous film of the present invention can be obtained by forming a sheet using a resin composition containing an ultrahigh-molecular-weight polyolefin, a polyolefin wax, and additionally a filler, and then stretching the sheet uniaxially or biaxially. The porous film can also be obtained by stretching the sheet after removing the filler, or by stretching the sheet and then removing the filler.

For the filler, inorganic or organic fine particles, which are generally called as filling material, can be used. As the inorganic fine particles, fine particles of calcium carbonate, talc, clay, kaolin, silica, hydrotalcite, diatomaceous earth, magnesium carbonate, barium carbonate, calcium sulfate, magnesium sulfate, barium sulfate, aluminum hydroxide, magnesium hydroxide, calcium oxide, magnesium oxide, titanium oxide, alumina, mica, zeolite, glass powder, zinc oxide or the like can be used. Among these, fine particles of calcium carbonate or barium sulfate are preferred. As the organic fine particles, known resin fine particles can be used, and the resin is preferably a polymer obtained by polymerizing a single monomer or two or more kinds of monomers, such as styrene, acrylonitrile, methyl methacrylate, ethyl methacrylate, glycidyl methacrylate and methyl acrylate; or a polycondensed resin such as melamine and urea.

The filler may be removed before or after stretching the sheet. In this connection, the filler is preferably soluble in a neutral, acidic or alkaline aqueous solution or water in order to easily remove the filler. Examples of the filler soluble in an aqueous solution or water include, out of the above-described fine particles, talc, clay, kaolin, diatomaceous earth, calcium carbonate, magnesium carbonate, barium carbonate, magnesium sulfate, calcium oxide, calcium oxide, magnesium hydroxide, calcium hydroxide, zinc oxide and silica. Among these, calcium carbonate is preferred.

The average particle diameter of the filler is preferably from 0.01 to 3 µm, more preferably from 0.02 to 1 µm, and most preferably from 0.05 to 0.5 µm. When the average particle diameter is 3 µm or less, a film having a better puncture strength can be obtained, and when the average particle diameter is 0.01 µm or more, the filler tends to be highly dispersed in the ultrahigh-molecular-weight polyolefin and the polyolefin wax, and therefore uniform pores can be easily formed by the stretching.

The filler is preferably surface-treated so as to facilitate dispersion in the ultrahigh-molecular-weight polyolefin and the polyolefin wax, to accelerate the interfacial delamination from the ultrahigh-molecular-weight polyolefin and the polyolefin wax when making the sheet porous by stretching, or to prevent absorption of water from the outside. Examples of the surface-treating agent include a higher fatty acid such as stearic acid and lauric acid, and metal salts thereof.

In the case of using a resin composition containing a filler, provided that the total volume of the ultrahigh-molecular-weight polyolefin and polyolefin wax contained in the resin composition is 100 parts by volume, the content of the filler in the resin composition is preferably from 15 to 150 parts by volume, and more preferably from 25 to 100 parts by volume. When the content is 15 parts by volume or more, sufficient pores can be formed by the stretching, whereby a good porous film can be obtained. Also, when the content is 150 parts by volume or less, due to the high resin ratio, a porous film having good puncture strength can be obtained.

In the resin composition used for the present invention, if desired, general additives (such as antistatic agent, plasticizer, lubricant, antioxidant and nucleating agent) may be added within the range not seriously impairing the object of the present invention.

The above-described ultrahigh-molecular-weight polyolefin and polyolefin wax, and furthermore, if desired, a filler, other additives and other resins are kneaded to produce a resin composition. The kneading is preferably performed in a kneading apparatus having a high shear force, and specific examples thereof include a roll, a Banbury mixer, a single-screw extruder, and a twin-screw extruder.

The method for producing a sheet using the resin composition is not particularly limited, but examples thereof include an inflation process, a calendering process, a T-die extrusion process and a scaif process. The sheet is preferably produced by the following method in order to obtain a sheet having a higher film thickness accuracy.

The preferred production method of the sheet is a method of roll-forming the resin composition by using a pair of rotary forming tools adjusted to have a surface temperature which is higher than the melting point of the ultrahigh-molecular-weight polyolefin contained in the resin composition. The surface temperature of the rotary forming tool is preferably the melting point+5° C. or more. The upper limit of the surface temperature is preferably the melting point+30° C. or less, and more preferably the melting point+20° C. or less. The tool as the pair of rotary forming tools includes a roll and a belt. The peripheral velocities of two rotary forming tools need not be always strictly the same, but are sufficient if the difference therebetween is within about ±5%. A porous film is produced using the sheet obtained by such a method, whereby a porous film having good strength, ion permeability, air permeability and the like can be obtained. Also, it is possible to use a sheet wherein single-layer sheets obtained by the method above are laminated with each other for the production of the porous film.

As the resin composition that is roll-formed by a pair of rotary forming tools, it is possible to directly use a resin composition discharged as a strand from the extruder for producing the resin composition, or to use a resin composition that is once pelletized.

The method for stretching the sheet obtained by the shape-forming of the resin composition to produce a porous film is not particularly limited, and the porous film may be produced by stretching the sheet with use of a known apparatus such as tenter, roll and autograph. The stretching may be in the uniaxial direction or biaxial direction, and the stretching may be performed in a single stage or may be performed in multiple stages. In order to cause interfacial delamination between the resin and the filler, the stretching ratio is preferably from 2 to 12 times, more preferably from 4 to 10 times. The stretching is usually performed at the softening point or higher but the melting point or lower of the ultrahigh-molecular-weight polyolefin, and is preferably performed at 80 to 120° C. By performing the stretching at such a temperature, the film tends not to rupture during stretching, and at the same time, the ultrahigh-molecular-weight polyolefin tends not to melt, as a result, pores produced by the interfacial delamination between the resin and the filler tend not to close. Also, after the stretching, a heat stabilizing treatment may be performed, if desired, so as to stabilize the pore morphology.

The sheet obtained by shape-forming the resin composition may be stretched to produce a porous film after removing at least a part of the filler from the sheet. Alternatively, after stretching the sheet obtained by shape-forming the resin composition, at least a part of the filler may be removed to produce a porous film. The method for removing the filler includes a method of dipping the sheet or the film after stretching in a liquid capable of dissolving the filler.

In the present invention, a porous heat-resistant layer can be laminated on at least one surface of the porous film obtained by the above-described method. The laminated porous film having such a heat-resistant layer is superior in the thickness uniformity, heat resistance, strength and ion permeability. When a battery is produced using the laminated porous film as the separator, even if the porous film is melted upon extraordinary heat generation due to overcharge, the heat-resistant layer advantageously prevents the contact of the positive electrode with the negative electrode, thereby ensuring excellent safety.

The heat-resistant resin constituting the heat-resistant layer is preferably a polymer containing nitrogen atom in the main chain, and a polymer containing nitrogen atom and an aromatic ring is more preferred in view of heat resistance. Examples thereof include an aromatic polyamide (hereinafter, sometimes referred to as an "aramid"), an aromatic polyimide (hereinafter, sometimes referred to as a "polyimide"), and an aromatic polyamideimide. Examples of the aramid include a meta-oriented aromatic polyamide and a para-oriented aromatic polyamide (hereinafter, sometimes referred to as a "para-aramid"). A para-aramid is preferred, because a porous heat-resistant layer with uniform film thickness and high air permeability is easily formed.

The para-aramid is obtained by condensation polymerization of a para-oriented aromatic diamine with a para-oriented aromatic dicarboxylic halide, and is substantially composed of a repeating unit where an amide bond is bonded to the para-position or similar orientation position of an aromatic ring (for example, an orientation position extending coaxially or parallelly to the reverse direction, as in the case of 4,4'-biphenylene, 1,5-naphthalene and 2,6-naphthalene). Specific examples thereof include a para-aramid having a structure of a para-orientation or quasi-para-orientation type, such as poly(paraphenyleneterephthalamide), poly(parabenzamide), poly(4,4'-benzanilideterephthalamide), poly(paraphenylene-4,4'-biphenylenedicarboxylic acid amide), poly(paraphenylene-2,6-naphthalenedicarboxylic acid amide), poly(2-chloroparaphenyleneterephthalamide) and paraphenyleneterephthalamide/2,6-dichloroparaphenyleneterephthalamide copolymer.

At the time of providing the heat-resistant layer, the heat-resistant resin is usually dissolved in a solvent and used as a coating fluid. In the case where the heat-resistant resin is a para-aramid, a polar amide-based solvent or a polar urea-based solvent may be used as the solvent. Specific examples thereof include, but are not limited to, N,N-dimethylformamide, N,N-dimethylacetamide, N-methyl-2-pyrrolidone and tetramethylurea.

In view of coatability, the heat-resistant resin is preferably a heat-resistant resin having an intrinsic viscosity of 1.0 to 2.8 dl/g, and more preferably a heat-resistant resin having an intrinsic viscosity of 1.7 to 2.5 dl/g. The intrinsic viscosity as used herein is a value measured by dissolving a precipitated heat-resistant resin to make a heat-resistant resin sulfuric acid solution. In view of coatability, the heat-resistant resin concentration in the coating fluid is preferably from 0.5 to 10 wt %.

In the case of using a para-aramid as the heat-resistant resin, in order to improve solubility of the para-aramid in a solvent, an alkali metal chloride or an alkaline earth metal chloride is preferably added at the production of the para-aramid. Specific examples thereof include, but are not limited to, lithium chloride and calcium chloride. The amount of the chloride added to the polymerization system is preferably from 0.5 to 6.0 mol, more preferably from 1.0 to 4.0 mol, per 1.0 mol of an amide bond produced by condensation polymerization. When the amount of the chloride is 0.5 mol or more, the para-aramid produced has sufficient solubility, and when the amount is 6.0 mol or less, the chloride is advantageously kept from remaining undissolved in a solvent. Generally, when the amount of the alkali metal chloride or alkaline earth metal chloride is 2 wt % or more, the solubility of the para-aramid becomes sufficient in many cases, and when the amount is 10 wt % or less, the alkali metal chloride or alkaline earth metal chloride is, in many cases, completely dissolved without remaining undissolved in a polar organic solvent such as polar amide-based solvent and polar urea-based solvent.

The polyimide is preferably a whole aromatic polyimide produced by condensation polymerization of an aromatic diacid anhydride with an aromatic diamine. Specific examples of the diacid anhydride include pyromellitic dianhydride, 4,4'-(hexafluoroisopropylidene)diphthalic anhydride, and 3,3',4,4'-biphenyltetracarboxylic dianhydride. Specific examples of the diamine include oxydianiline, para-phenylenediamine, 4,4'-benzophenonediamine, 3,3'-methylenedianiline, 3,3'-diaminobenzophenone, 3,3'-diaminodiphenylsulfone, and 1,5-naphthalenediamine, but the present invention is not limited thereto. In the present invention, a polyimide soluble in a solvent can be suitably used. Examples of such a polyimide include a polyimide that is a condensation polymerization product of 3,3',4,4'-diphenylsulfonetetracarboxylic dianhydride with an aromatic diamine. Examples of the polar organic solvent which can be suitably used for dissolving the polyimide include dimethylsulfoxide, cresol and o-chlorophenol, in addition to those illustrated as the solvent for dissolving the para-aramid.

In the present invention, the coating fluid used for forming the heat-resistant layer preferably contains inorganic particles. When the heat-resistant layer is formed using a coating fluid which is prepared by adding inorganic fine particles to a solution having any heat-resistant resin concentration, a finely porous heat-resistant layer having a uniform thickness can be formed. Also, air permeability can be controlled by the amount of the inorganic fine particles added. In view of strength of the porous film or smoothness of the heat-resistant layer surface, the inorganic fine particles for use in the present invention preferably has an average primary particle diameter of 1.0 µm or less, more preferably 0.5 µm or less, and still more preferably 0.1 µm or less.

The content of the inorganic fine particles in the heat-resistant layer is preferably from 1 to 95 wt %, and more preferably from 5 to 50 wt %. When the content is 1 wt % or more, sufficient porosity is obtained, and this leads to excellent ion permeability. When the content is 95 wt % or less, the film strength is sufficient, and in turn, the handleability is superior. The shape of the inorganic fine particles used is not particularly limited, and can be either a spherical shape or a random shape.

The inorganic fine particles used when forming the heat-resistant layer is preferably a ceramic powder. The ceramic powder includes a ceramic powder composed of, for example, an electrically insulating metal oxide, metal nitride or metal carbide. For example, a powder of alumina, silica, titanium dioxide or zirconium oxide is preferably used. One of these ceramic powders may be used alone, two or more kinds thereof may be mixed, and the same or different kinds of ceramic powders having different particle diameter may be optionally mixed and used.

Examples of the method for laminating a heat-resistant layer on the porous film formed of the resin composition containing an ultrahigh-molecular-weight polyolefin and a polyolefin wax include a method of separately producing a heat-resistant layer and then laminating it on the porous film, and a method of applying a coating fluid containing inorganic fine particles and a heat-resistant resin on at least one surface of the porous film to form a heat-resistant layer. In view of productivity, the latter method is preferred. Specifically, the latter method includes a method comprising the following steps:

(a) preparing a slurried coating fluid containing from 1 to 500 parts by weight of inorganic fine particles dispersed in a solution containing 100 parts by weight of a heat-resistant resin, (b) applying the coating fluid on at least one surface of the porous film to form an applied film, and (c) precipitating the heat-resistant resin from the applied film by a technique such as humidification, solvent removal or dipping in a solvent incapable of dissolving the heat-resistant resin, and then, if desired, drying the heat-resistant resin.

The coating fluid is preferably applied continuously using the coating apparatus described in JP2001-316006A and the method described in JP2001-23602A.

Also, a heat-resistant layer may be laminated on both surfaces of the porous film by dipping the porous film in the coating fluid containing a heat-resistant resin, and then drying it.

The porous film of the present invention exhibits superior permeability at the operating temperature, can cause shutdown at a low temperature in case of exceeding the operating temperature, and is suitable as a separator for a nonaqueous battery. Furthermore, the laminated porous film obtained by laminating a heat-resistant layer on the porous film of the present invention is superior in the heat resistance, strength and ion permeability, and can be suitably used as a separator for a nonaqueous battery, particularly for a lithium secondary battery.

In the case where the battery separator of the present invention has the porous film of the present invention, in view of electrolytic solution retention ability, film strength, and shutdown performance, the porosity of the porous film is preferably from 30 to 80 vol %, and more preferably from 40 to 70 vol %. Also, from the standpoint of maintaining the shutdown function, preventing short-circuit during winding, and increasing the electric capacity of a battery, the thickness of the porous film is preferably from 5 to 50 µm, more preferably from 10 to 50 µm, and still more preferably from 10 to 30 µm. The pore size of the porous film is preferably 0.1 µm or less, and more preferably 0.08 µm or less. With a smaller pore size, a porous film having a smaller film resistance is obtained at the same air permeability.

In the case where the battery separator of the present invention has the laminated porous film of the present invention, the preferred porosity and pore size of the porous film in the laminated porous film are the same as those of the above-described porous film. However, the film thickness as the entire laminated porous film is preferably from 5 to 50 µm, more preferably from 10 to 50 µm, and still more preferably from 10 to 30 µm. In the laminated porous film, in view of electrolytic solution retention ability and strength, the porosity of the heat-resistant layer is preferably from 30 to 80 vol %, and more preferably from 40 to 70 vol %. From the standpoint of preventing contraction at heating and of satisfying load characteristics when a battery is fabricated, the film thickness of the heat-resistant layer is preferably from 0.5 to 10 µm, and more preferably from 1 to 5 µm.

The battery of the present invention is provided with the battery separator of the present invention. The elements other than the battery separator are described in detail below with referring to a case where the battery of the present invention is a nonaqueous electrolyte secondary battery such as lithium battery.

As the nonaqueous electrolytic solution, it is possible to use, for example, a nonaqueous electrolytic solution prepared by dissolving a lithium salt in an organic solvent. The lithium salt includes one or a mixture of two or more selected from the group consisting of $LiClO_4$, $LiPF_6$, $LiAsF_6$, $LiSbF_6$, $LiBF_4$, $LiCF_3SO_3$, $LiN(SO_2CF_3)_2$, $LiC(SO_2CF_3)_3$, $Li_2B_{10}Cl_{10}$, a lower aliphatic lithium carboxylate, $LiAlCl_4$ and the like. Among these, a lithium salt containing at least one selected from the group consisting of fluorine-containing lithium salts of $LiPF_6$, $LiAsF_6$, $LiSbF_6$, $LiBF_4$, $LiCF_3SO_3$, $LiN(CF_3SO_2)_2$ and $LiC(CF_3SO_2)_3$ is preferably used.

Examples of the organic solvent which can be used in the nonaqueous electrolytic solution include carbonates such as propylene carbonate, ethylene carbonate, dimethyl carbonate, diethyl carbonate, ethylmethyl carbonate, 4-trifluoromethyl-1,3-dioxolan-2-one and 1,2-di(methoxycarbonyloxy) ethane; ethers such as 1,2-dimethoxyethane, 1,3-dimethoxypropane, pentafluoropropyl methyl ether, 2,2,3,3-tetrafluoropropyldifluoromethyl ether, tetrahydrofuran and 2-methyltetrahydrofuran; esters such as methyl formate, methyl acetate and γ-butyrolactone; nitriles such as acetonitrile and butyronitrile; amides such as N,N-dimethylformamide and N,N-dimethylacetamide; carbamates such as 3-methyl-2-oxazolidone; sulfur-containing compounds such as sulfolane, dimethyl sulfoxide and 1,3-propanesultone; and those obtained by introducing a fluorine substituent into the organic solvents above. Usually, two or more out of these organic solvents are mixed and used.

Among these, a mixed solvent containing carbonates is preferred, and a mixed solvent of a cyclic carbonate and an acyclic carbonate, and a mixed solvent of a cyclic carbonate and ethers are more preferred. The mixed solvent of a cyclic carbonate and an acyclic carbonate is preferably a mixed solvent containing ethylene carbonate, dimethyl carbonate and ethyl methyl carbonate, because it provides a wide operation temperature range and a good loading characteristics, and it is not easily decomposed even when a graphite material such as natural graphite and artificial graphite is used as the negative electrode active material. As the positive electrode sheet, a sheet obtained by loading, on a current collector, a mixture containing a positive electrode active material, an electrically conductive material and a binder is usually used. Specifically, it is possible to use a mixture containing a material capable of being doped/dedoped with lithium ions as the positive electrode active material, a carbonaceous material as the electrically conductive material, and a thermoplastic resin or the like as the binder. The material capable of being doped/dedoped with lithium ions includes a lithium mixed oxide containing at least one transition metal such as V, Mn, Fe, Co and Ni. Above all, it is possible to use a layered lithium mixed oxide having an α-NaFeO$_2$ structure as the matrix, such as lithium nickelate and lithium cobaltate, or a lithium mixed oxide having a spinel structure as the matrix, such as lithium manganese spinel.

The lithium mixed oxide may contain various additive elements. Particularly, when a mixed lithium nickelate containing at least one metal selected from the group consisting of Ti, V, Cr, Mn, Fe, Co, Cu, Ag, Mg, Al, Ga, In and Sn is used such that the at least one metal is in an amount of 0.1 to 20 mol %, based on the sum of the molar number of the metal and the molar number of Ni in lithium nickelate, the cycle property in high capacity usage is advantageously enhanced.

Examples of the thermoplastic resin as the binder include polyvinylidene fluoride, vinylidene fluoride copolymer, polytetrafluoroethylene, tetrafluoroethylene-hexafluoropropylene copolymer, tetrafluoroethylene-perfluoroalkyl vinyl ether copolymer, ethylene-tetrafluoroethylene, copolymer vinylidene fluoride-hexafluoropropylene-tetrafluoroethylene copolymer, a thermoplastic polyimide, polyethylene, and polypropylene.

Examples of the carbonaceous material as the electrically conductive material include natural graphite, artificial graphite, cokes and carbon black. These may be used individually, or a combination of electrically conductive materials may be selected, for example, artificial graphite and carbon black may be mixed and used.

Examples of the negative electrode sheet include a material capable of being doped/dedoped with lithium ions, a lithium metal, and a lithium alloy. The material capable of being doped/dedoped with lithium ions includes a carbonaceous material such as natural graphite, artificial graphite, cokes, carbon black, pyrolytic carbons, carbon fiber, and fired organic polymer compound; and a chalcogen compound such as oxide and sulfide capable of being doped/dedoped with lithium ions at a lower potential than that of the positive electrode. The carbonaceous material is preferably a carbonaceous material containing, as the main component, a graphite material such as natural graphite and artificial graphite, since due to high potential flatness and low average discharge potential, a large energy density is obtained when combined with the positive electrode.

As the negative electrode current collector, Cu, Ni, stainless steel or the like may be used, but particularly in a lithium secondary battery, Cu is preferred because of its tendency not to make an alloy with lithium and easy processability into a thin film. The method for loading a negative electrode active material-containing mixture on the negative electrode current collector includes a pressure molding method, and a method of making a paste with use of a solvent or the like, applying the paste to a current collector, drying the paste, and then pressure-bonding the dried layer through pressing or the like.

The shape of the battery of the present invention is not particularly limited, and may be any of paper type, coin type, cylinder type, square type and the like.

EXAMPLES

The present invention is described in greater detail below by referring to Examples and Comparative Examples, but the present invention is not limited to the following Examples.

(1) Measurement of Branching Degree

The polyolefin wax was subjected to $^1$H-NMR measurement using o-dichlorobenzene-d4 as the solvent. The number of branches per 1,000 carbon atoms (/1000C) constituting the main chain in the polyolefin wax was calculated from the peak area of the measurement.

(2) DSC Measurement

The measurement was performed, at a temperature rise rate of 10° C./min, using SSC/5200 manufactured by Seiko Instruments Inc.

(3) Measurement of Adhesive Strength

Synthesis of Para-Aramid (poly(paraphenyleneterephthalamide))

Production of poly(paraphenyleneterephthalamide) was performed using a 3 liter-volume separable flask having a stirring blade, a thermometer, a nitrogen inlet tube and a powder addition port. The flask was thoroughly dried, and charged with 2,200 g of N-methyl-2-pyrrolidone (NMP); and 151.07 g of calcium chloride powder vacuum-dried at 200° C. for 2 hours was added thereto, and completely dissolved by raising the temperature to 100° C. The temperature was returned to room temperature, and 68.23 g of paraphenylenediamine was added and completely dissolved. While keeping this solution at 20° C.±2° C., 124.97 g of terephthalic acid dichloride was added in 10 portions every about 5 minutes.

Thereafter, while still keeping the solution at 20° C.±2° C., aging was performed with stirring for 1 hour. The resulting solution was filtered through a 1,500-mesh stainless steel screen. The obtained solution had a para-aramid concentration of 6%.

Preparation of Coating Fluid

Subsequently, 100 g of the para-aramid solution polymerized above was weighed in a flask, and 300 g of NMP was added thereto to prepare a solution having a para-aramid concentration of 1.5 wt %. After stirring for 60 minutes, 6 g of Alumina C (produced by Nippon Aerosil Co., Ltd.) and 6 g of Advanced Alumina AA-03 (produced by Sumitomo Chemical Co., Ltd) were mixed with the solution having a para-aramid concentration of 1.5 wt %, and the resulting mixture was stirred for 240 minutes. The obtained solution was filtered through a 1,000-mesh metal screen, and then 0.73 g of calcium oxide was added thereto. The resulting mixture was stirred for 240 minutes to effect neutralization, and then defoamed under reduced pressure to obtain a slurried coating fluid.

Measurement of Adhesive Strength

The coating fluid obtained above was applied on the porous film by a bar coater to a thickness of 130 μm, and the resultant was then placed in an oven at 50° C. and 70% RH (Relative Humidity) for 15 seconds to precipitate the para-aramid on the porous film. A weight was put on a 2 cm-square SUS plate having one projection of 1.5 R, and, by sliding the projected part on the precipitated para-aramid layer, the maximum weight of the weight at which the para-aramid layer was not peeled off was measured. A larger weight of the weight indicates higher adhesive strength between the para-aramid layer and the porous film.

Example 1

To 85 wt % of an ultrahigh-molecular-weight polyethylene powder (GUR4012, produced by Ticona) and 15 wt % of a polyethylene wax having a weight average molecular weight of 1,000 (FNP-0115, degree of branching: 1/1000C, produced by Nippon Seiro Co., Ltd.), 0.4 wt % of an antioxidant (Irg1010, produced by Ciba Specialty Chemicals), 0.1 wt % of an antioxidant (P168, produced by Ciba Specialty Chemicals) and 1.3 wt % of sodium stearate were added per 100 parts by weight of the total of the ultrahigh-molecular-weight polyethylene and the polyethylene wax. Further, 38 vol % calcium carbonate having an average pore size of 0.1 μm (produced by Maruo Calcium Co., Ltd.) was added, based on the entire volume. These, were in the powder form, directly mixed in a Henschel mixer, and then melt-kneaded in a twin-screw kneader to prepare a polyolefin resin composition. The polyolefin resin composition obtained was rolled between a pair of rolls having a surface temperature of 150° C. to prepare a sheet having a film thickness of about 60 μm. This sheet was dipped in an aqueous hydrochloric acid solution (hydrochloric acid: 4 mol/L, nonionic surfactant: 0.5 wt %) to remove calcium carbonate, and then stretched 5.8 times at 105° C. to obtain Porous Film (A1).

An aramid layer was laminated on Porous Film (A1) according to the method described in "Measurement of Adhesive Strength" of (3) above, and the adhesive strength was measured and found to be 7 g.

Example 2

To 70 wt % of an ultrahigh-molecular-weight polyethylene powder (340M, produced by Mitsui Chemicals, Inc.) and 30 wt % of a polyethylene wax having a weight average molecular weight of 1,000 (FNP-0115, produced by Nippon Seiro Co., Ltd.), 0.4 wt % of an antioxidant (Irg1010, produced by Ciba Specialty Chemicals), 0.1 wt % of an antioxidant (P168, produced by Ciba Specialty Chemicals) and 1.3 wt % of sodium stearate were added per 100 parts by weight of the ultrahigh-molecular-weight polyethylene and the polyethylene wax. Further, 38 vol % of calcium carbonate having an average pore size of 0.1 μm (produced by Maruo Calcium Co., Ltd.) was added, based on the entire volume. These were, in the powder form, directly mixed in a Henschel mixer, and then melt-kneaded in a twin-screw kneader to prepare a polyolefin resin composition. The polyolefin resin composition obtained was rolled between a pair of rolls having a surface temperature of 150° C. to prepare a sheet having a film thickness of about 60 μm. This sheet was dipped in an aqueous hydrochloric acid solution (hydrochloric acid: 4 mol/L, nonionic surfactant: 0.5 wt %) to remove calcium carbonate, and then, stretched 5.8 times at 105° C. to obtain Porous Film (A2).

Porous Film (A2) was subjected to DSC measurement, as a result, it was confirmed that a component which melts at 60° C. was absent.

An aramid layer was laminated on Porous Film (A2) according to the method described in "Measurement of Adhesive Strength" of (3) above, and the adhesive strength was measured and found to be 9 g.

Comparative Example 1

Porous Film (B) was obtained in the same manner as in Example 1 except for using, as the polyethylene wax, Hi-Wax 110P having a weight average molecular weight of 1,000 produced by Mitsui Chemicals, Inc. (degree of branching: 18/1000C).

Porous Film (B) was subjected to DSC measurement, as a result, it was confirmed that a component which melts at 60° C. was present.

An aramid layer was laminated on Porous Film (B) in the same manner as in Example 1, and the adhesive strength was measured and found to be 5 g.

INDUSTRIAL APPLICABILITY

According to the present invention, it is possible to provide a porous film ensuring that, when a heat-resistant layer is laminated thereon, the heat-resistant layer does not tend to be separated. Further, according to the present invention, it is possible to provide a laminated porous film comprising the porous film and a porous heat-resistant layer laminated together, a battery separator, and a battery.

The invention claimed is:

1. A battery separator, comprising a porous film obtained using a resin composition containing an ultrahigh-molecular-weight polyolefin and a polyolefin wax having a weight average molecular weight of 3,000 or less, wherein the number of branches per 1,000 carbon atoms constituting the main chain of the polyolefin wax is 15 or less.

2. A battery separator comprising a porous film obtained using a resin composition containing an ultrahigh-molecular-weight polyolefin and a polyolefin wax having a weight average molecular weight of 3,000 or less, wherein the film is substantially free from a component which melts at 60° C. or lower.

3. The battery separator according to claim 1, wherein the resin composition contains the polyolefin wax in an amount of 5 to 50 wt %, provided that the weight of the resin composition is 100%.

4. A battery separator comprising a laminated porous film, wherein a porous heat-resistant layer is laminated on at least one surface of a porous film obtained using a resin composition containing an ultrahigh-molecular-weight polyolefin and a polyolefin wax having a weight average molecular weight of 3,000 or less, wherein the number of branches per 1,000 carbon atoms constituting the main chain of the polyolefin wax is 15 or less.

5. A battery comprising the battery separator according to claim 1.

6. A battery comprising the battery separator according to claim 4.

7. The battery separator according to claim 2, wherein the resin composition contains the polyolefin wax in an amount of 5 to 50 wt %, provided that the weight of the resin composition is 100%.

8. A battery separator comprising a laminated porous film, wherein a porous heat-resistant layer is laminated on at least one surface of a porous film obtained using a resin composition containing an ultrahigh-molecular-weight polyolefin and a polyolefin wax having a weight average molecular weight of 3,000 or less, wherein the film is substantially free from a component which melts at 60° C. or lower.

9. A battery comprising the battery separator according to claim 2.

10. A battery comprising the battery separator according to claim 8.

* * * * *